(12) United States Patent
Zhang (10) Patent No.: US 10,060,574 B2
(45) Date of Patent: Aug. 28, 2018

(54) SUPPORTING DEVICE (71) Applicant: Wistron Corporation, New Taipei (TW)

(72) Inventor: Liang Zhang, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 14/856,245

(22) Filed: Sep. 16, 2015

(65) Prior Publication Data

US 2016/0219735 A1  Jul. 28, 2016

(30) Foreign Application Priority Data

Jan. 28, 2015 (CN) .......................... 2015 1 0043970

(51) Int. Cl.
*F16M 11/10* (2006.01)
*F16M 13/00* (2006.01)
*G06F 1/16* (2006.01)

(52) U.S. Cl.
CPC ............ *F16M 11/10* (2013.01); *F16M 13/00* (2013.01); *F16M 13/005* (2013.01); *G06F 1/166* (2013.01); *G06F 1/1626* (2013.01); *F16M 2200/022* (2013.01)

(58) Field of Classification Search
CPC .... G06F 1/1601; H05K 5/0234; F16M 11/10; F16M 11/38; F16M 13/00; F16M 13/005; F16M 2200/08; H04M 1/04; E05C 19/06; E05C 19/063; Y10T 292/0814; Y10T 292/0817; Y10T 292/082; Y10T 292/0876; Y10T 292/088; Y10T 292/0894; Y10T 292/0898; Y10T 292/0902; Y10T 292/0907; Y10S 292/61

USPC ....... 248/686, 688, 454, 455, 456, 462, 923, 248/297.21, 297.31; 361/679.59; 40/748, 40/749, 753, 755, 756; 292/80, 81, 84, 292/87, 203; 455/575.4
See application file for complete search history.

(56) References Cited

U.S. PATENT DOCUMENTS

| | | | | |
|---|---|---|---|---|
| 5,732,928 A | * | 3/1998 | Chang .................. | G06F 3/0208 248/456 |
| 6,971,622 B2 | * | 12/2005 | Ziegler ................. | F16M 11/10 248/454 |
| 7,001,088 B2 | * | 2/2006 | Hui-hu .................. | G06F 3/0208 248/127 |

(Continued)

OTHER PUBLICATIONS

Wikipedia, Angle, Retrieved Jan. 30, 2018, https://en.wikipedia.org/wiki/Angle. (Year: 2018).*

*Primary Examiner* — Jonathan Liu
*Assistant Examiner* — Guang H Guan
(74) *Attorney, Agent, or Firm* — Muncy, Geissler, Olds & Lowe, P.C.

(57) ABSTRACT

A supporting device includes a housing, a support board, a linkage trestle and a plurality of elastic bodies. The support board pivots on the housing. The linkage trestle includes a pivot end and a sliding end, the pivot end is pivotally connected to the support board, and the sliding end abuts the housing. The plurality of elastic bodies are disposed in the housing, and the elastic bodies form a slide channel in the housing, wherein the sliding end is disposed in the slide channel, the sliding end abuts the elastic bodies, and the elastic bodies change the width of the slide channel with the movement of the sliding end such that the elastic bodies push against the sliding end.

7 Claims, 6 Drawing Sheets

(56) References Cited

U.S. PATENT DOCUMENTS

| | | | | |
|---|---|---|---|---|
| 7,011,285 B2* | 3/2006 | Wang | F16M 11/10 | 248/673 |
| 7,104,516 B2* | 9/2006 | Uto | F16M 11/10 | 248/456 |
| 7,158,818 B2* | 1/2007 | Lee | H04M 1/0237 | 455/550.1 |
| 7,239,506 B2* | 7/2007 | Ogawa | F16M 11/10 | 248/288.51 |
| 7,255,317 B2* | 8/2007 | Huang | F16M 11/10 | 248/125.7 |
| 7,301,759 B2* | 11/2007 | Hsiung | H05K 5/0234 | 248/188 |
| 7,320,451 B2* | 1/2008 | Ogawa | F16M 11/10 | 248/125.1 |
| 7,369,884 B2* | 5/2008 | Park | H04M 1/0237 | 348/14.01 |
| 7,753,336 B2* | 7/2010 | Hu | A47B 97/04 | 248/188.8 |
| 7,773,374 B2* | 8/2010 | Dong | H04M 1/0237 | 248/688 |
| 7,853,300 B2* | 12/2010 | Seidler | G06F 1/1624 | 379/433.11 |
| 7,986,511 B2* | 7/2011 | Dong | H04M 1/0237 | 361/679.01 |
| 8,121,660 B2* | 2/2012 | Park | H04M 1/0237 | 455/575.4 |
| 8,162,283 B1* | 4/2012 | Royz | F16M 11/10 | 248/455 |
| 8,199,478 B2* | 6/2012 | Liang | H04M 1/0237 | 312/223.1 |
| 8,203,831 B2* | 6/2012 | Dong | H04M 1/0237 | 361/679.02 |
| 8,282,064 B2* | 10/2012 | Li | F16M 13/00 | 248/372.1 |
| 8,340,734 B2* | 12/2012 | Peng | H04M 1/0237 | 361/679.39 |
| 8,360,382 B2* | 1/2013 | Wu | F16M 11/10 | 248/165 |
| 8,464,995 B2* | 6/2013 | Yang | F16M 11/10 | 248/454 |
| 8,534,745 B1* | 9/2013 | Quinn | E05B 77/38 | 292/340 |
| 8,616,612 B2* | 12/2013 | Quinn | E05B 77/38 | 292/340 |
| 8,985,543 B2* | 3/2015 | Chen | A45C 11/00 | 206/45.24 |
| 9,068,692 B2* | 6/2015 | Park | F16M 11/10 | |
| 9,185,954 B2* | 11/2015 | Cheung | F16M 11/10 | |
| 9,683,694 B2* | 6/2017 | Shiba | F16M 13/005 | |
| 2007/0058330 A1* | 3/2007 | Lin | H04M 1/0237 | 361/679.27 |
| 2007/0284917 A1 | 12/2007 | Seidler | | |
| 2009/0149230 A1* | 6/2009 | Ruan | H04M 1/0237 | 455/575.4 |
| 2011/0050063 A1* | 3/2011 | Wang | H04N 1/00127 | 312/351.1 |
| 2012/0106054 A1 | 5/2012 | Royz et al. | | |
| 2015/0349830 A1* | 12/2015 | Lai | H04B 1/3877 | 455/575.4 |
| 2016/0219735 A1* | 7/2016 | Zhang | F16M 11/10 | |

* cited by examiner

SUPPORTING DEVICE

BACKGROUND OF THE INVENTION

1. Field of the Invention

The present disclosure relates to a supporting device, and more particularly to a supporting device that provides elastic force without a helical torsion spring.

2. Description of the Related Art

Using a support to balance and connect two objects is a common method of connection. The traditional support has a helical torsion spring at the pivot place of the support to generate an elastic force to balance the external force on the support.

However, helical torsion springs are formed in a columnar shape, so it is difficult to reduce the volume thereof. When the object requires a greater elastic force, the area of the cross-section of the helical torsion spring must be larger, and the overall volume of the helical torsion spring will be greater. This limitation of helical torsion springs limits their installation in objects equal to or smaller than a certain size.

SUMMARY OF THE INVENTION

The present disclosure solves the problem by providing a supporting device without a helical torsion spring.

To solve the problem described above, the present disclosure provides a supporting device. The supporting device includes a housing, a supporting board, a linkage trestle and at least one elastic body The supporting board pivots on the housing. The linkage trestle includes a pivot end and a sliding end. The pivot end pivots on the supporting board, and the sliding end is slideably disposed in the housing. At least one elastic body is disposed in the housing, and the elastic body forms a sliding channel in the housing wherein the sliding end is disposed in the sliding channel, the sliding end abuts the elastic body, and the elastic body changes the width of the sliding channel when the sliding end slides such that the elastic body pushes the sliding end.

According to said embodiment, the protective structure of the present disclosure at least has the advantages below: Due to the elastic body pressing against the sliding end of the linkage, when the linkage trestle slides along the supporting board, the elastic force of the elastic body is exerted on the linkage trestle to resist external force exerted on the supporting board.

BRIEF DESCRIPTION OF THE DRAWINGS

These and other objects and advantages of the present disclosure will become apparent from the following description of the accompanying drawings, which disclose several embodiments of the present disclosure. It is to be understood that the drawings are to be used for purposes of illustration only, and not as a definition of the disclosure.

In the drawings, wherein similar reference numerals denote similar elements throughout the several views.

DETAILED DESCRIPTION OF THE PREFERRED EMBODIMENT

Figure 1:
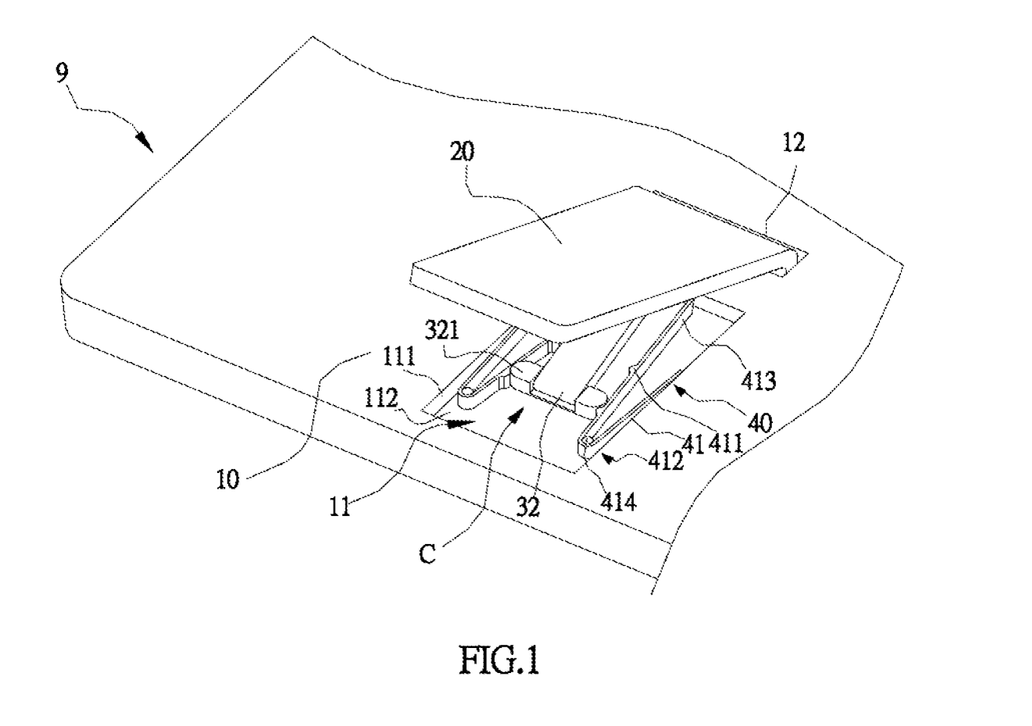
FIG. 1 is a structural diagram of one embodiment of the supporting device of the present disclosure.

As shown in FIG. 1, the present application provides a supporting device 1 applied on an electronic device 9 for connecting a machine (not shown), and the distance and the angle between the electronic device 9 and the machine are adjusted by the present device 1.

As shown in FIG. 1, the supporting device 1 includes a housing 10, a supporting board 20, a linkage trestle 30 and two elastic bodies 40. The housing 10 can be a part of the rear cover of the electronic device 9. One end of the supporting board 20 pivots with the housing, one end of the linkage trestle 30 pivots on the supporting board 20, and the other end of the linkage trestle 30 slides on the housing 10. The elastic bodies 40 are disposed in the housing 10 and the elastic bodies 40 apply force to the linkage trestle 30 to provide recovery force for the linkage trestle 30. The detailed structures of each component are described as follows.

Figure 2:
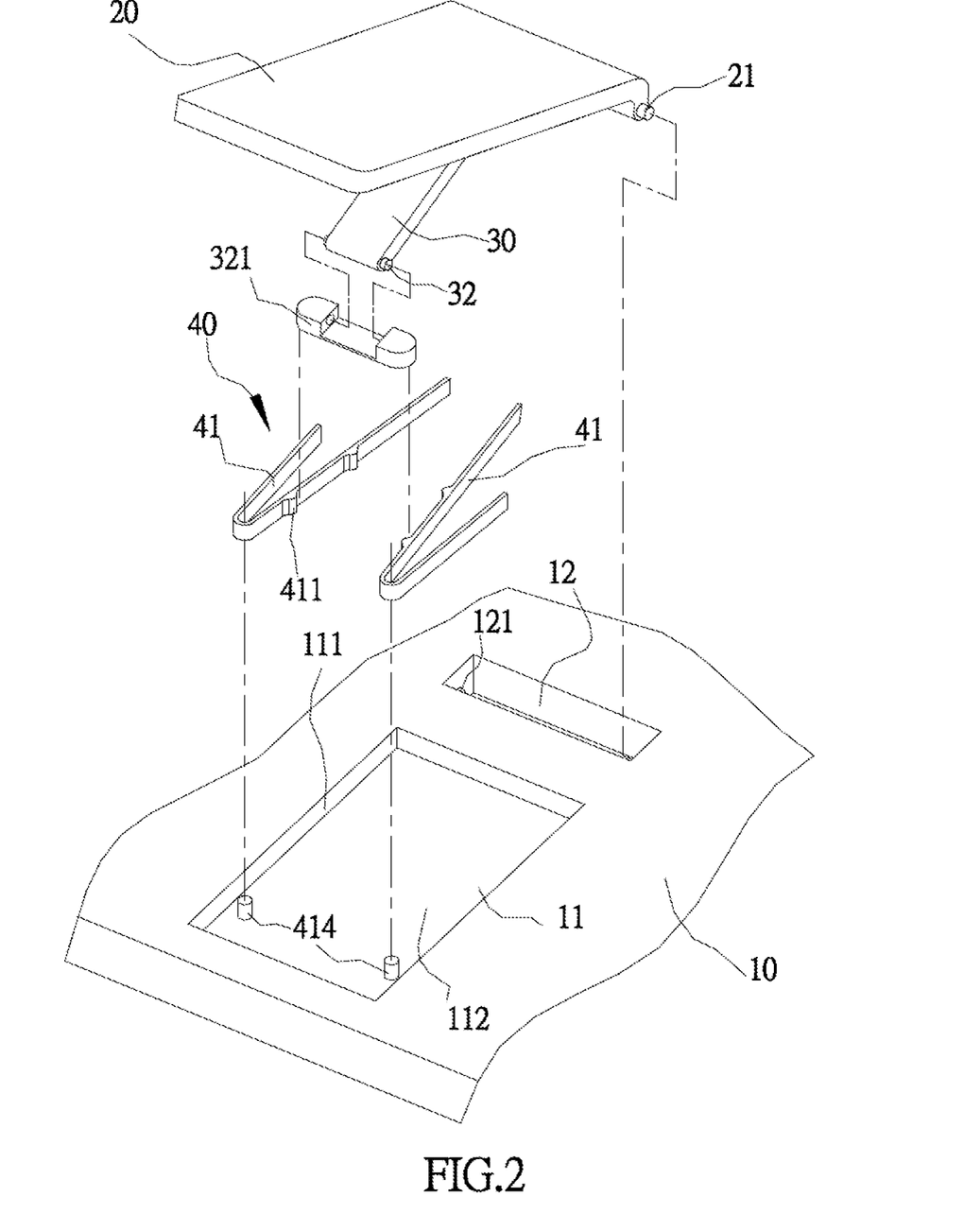
FIG. 2 is an exploded diagram of one embodiment of the supporting device of the present disclosure.
Figure 3:
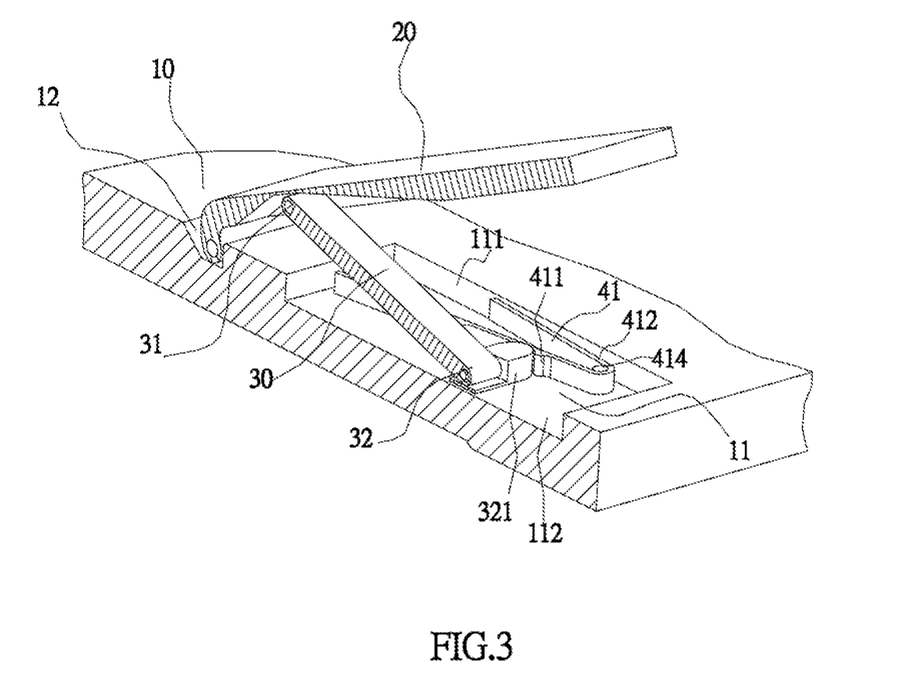
FIG. 3 is a cross-section diagram of the composition of one embodiment of the supporting device of the present disclosure.

As shown in FIG. 1, FIG. 2, and FIG. 3, the housing 10 includes a capacity groove 11 and a pivot groove 12. The capacity groove 11 is defined as having a bottom wall 112 and two side walls 111. The two ends of the linkage trestle 30 are defined as a pivot end 31 and a sliding end 32 separately. The sliding end 32 has a sliding lump 321, and the sliding lump 321 pivots on the sliding end 32. In one embodiment of the present disclosure, the elastic body 40 is a V-shaped leaf spring 41, defined as having an intermediate curved portion 412 and two top ends 413. According to changes in the distance between the two top ends 413, the V-shaped leaf spring generates elastic force. The V-shaped leaf spring 41 has a plurality of protrusions arranged at intervals. The two side faces of the pivot groove 12 have pivot holes 121 separately. The elastic body 40 can be a leaf body collocating with a spring (not shown), and the leaf body moves to change the length of the spring; therefore, the spring provides elastic force to the leaf body.

As shown in FIG. 1, FIG. 2, and FIG. 3, two sides of one end of the supporting board 20 have a pivot shaft 21 separately. The pivot shaft 21 is rotatably disposed in the pivot hole 121 such that one end of the supporting broad can pivot on the housing 10. The pivot end 31 of the linkage trestle 30 pivots on the supporting board 20, and the sliding end 32 with the sliding lump 321 presses against the bottom wall 112 of the capacity groove 11. The two V-shaped leaf springs 41 are placed in the capacity groove 11, and the top ends 413 of the two V-shaped leaf springs 41 press against the two side walls 111. The intermediate curved portion 412 of the two V-shaped leaf springs 41 is fixed on the bottom wall 112 of the capacity groove 11 via a fixing column 414. The two V-shaped leaf springs 41 are arranged at intervals; therefore, the two V-shaped leaf springs 41 form a sliding channel C between them such that the elastic body 40 forms the sliding channel C in the capacity groove 11. According to the compressibility of the V-shaped leaf spring 41, the gap of the sliding channel C can be adjusted. The sliding lump 321 is disposed in the sliding channel C, and the two V-shaped leaf springs 41 abut against the two ends of the sliding lump 321.

The following describes the function of the supporting device 1. As shown in FIG. 1, to conveniently describe it, the following defines the pivot place between supporting board 20 and the housing 10 as the top and the intermediate curved portion 412 near the V-shaped leaf spring 41 as the bottom. However, the present disclosure is not limited to this orientation.

Figure 4:
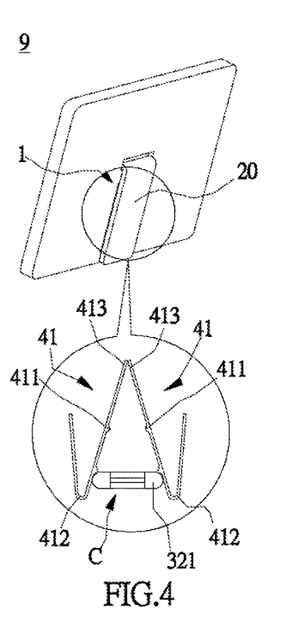
FIG. 4 is an actuator schematic of one embodiment of the supporting device of the present disclosure.

As shown in FIG. 4, when the supporting board 20 does not bear any external force, the supporting board 20 covers the capacity groove 11 (shown in FIG. 1), the pivot end 31 of the linkage trestle 30 is near the bottom wall 112 of the capacity groove 11, and the sliding end 32 of the linkage trestle 30 is located at the position near the intermediate curved portion 412 of the V-shaped leaf spring 41 in the sliding channel C. At this time, the compression amount of the V-shaped leaf spring 41 is the smallest, or zero. The width of the sliding channel C decreases from top to bottom.

Figure 5:
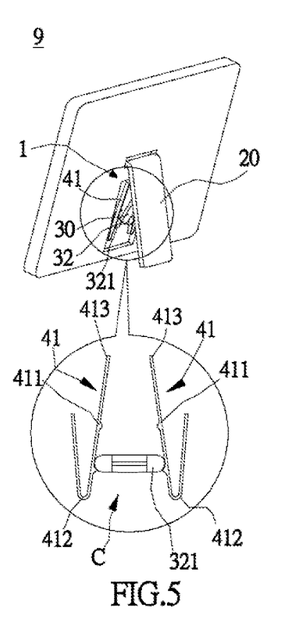
FIG. 5 is an actuator schematic of one embodiment of the supporting device of the present disclosure.
Figure 6:
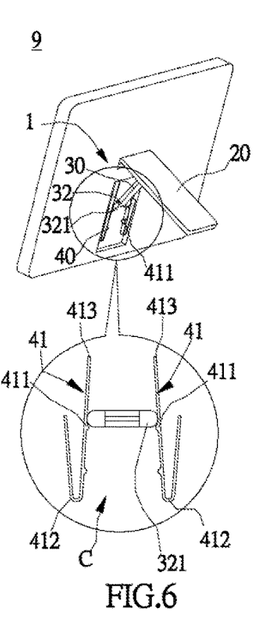
FIG. 6 is an actuator schematic of one embodiment of the supporting device of the present disclosure.
Figure 7:
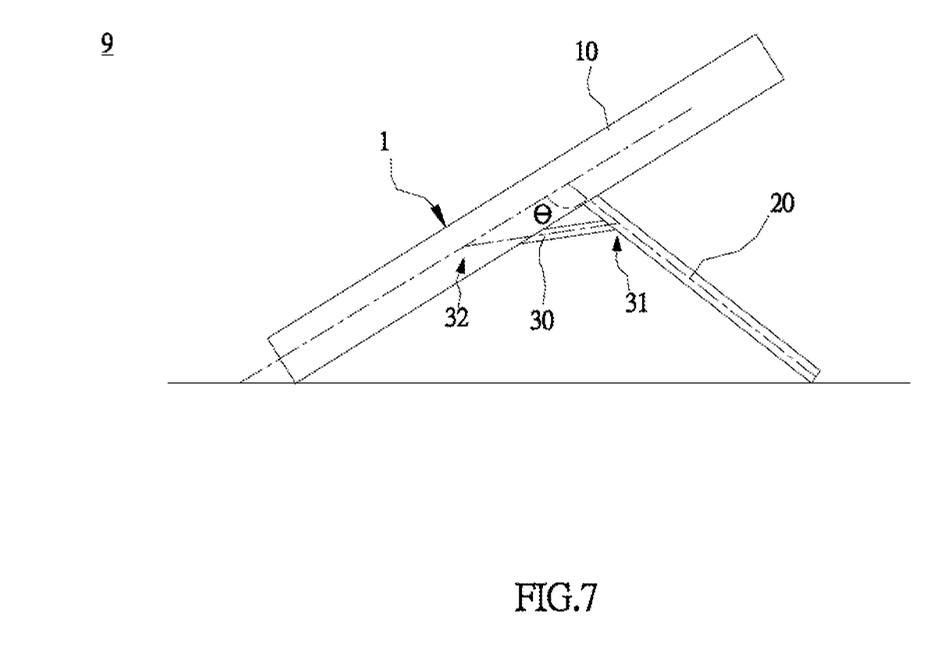
FIG. 7 is a usage diagram of one embodiment of the supporting device of the present disclosure.

As shown in FIG. 5 and FIG. 6, when the supporting board 20 bears external force, the supporting board 20 is lifted relative to the housing 10. The pivot end 31 of the linkage trestle 30 moves away from the bottom wall 112 of the capacity groove 11, and the sliding lump 321 of the sliding end 32 moves to the position near the top end 413 of the V-shaped leaf spring 41. As the sliding lump 321 moves, the sliding lump 321 squeezes the V-shaped leaf spring 41; therefore, the V-shaped leaf spring 41 generates elastic force to push against the sliding lump 321, and the touch angle between the V-shaped leaf spring 41 and the sliding lump 321 causes the force exerted on the sliding lump 321 by the V-shaped leaf spring 41 to be exerted in a downward direction. Therefore, the two V-shaped leaf springs 41 collectively exert force in a downward direction on the sliding lump 321. The force exerted on the sliding lump 321 by the V-shaped leaf spring 41 can resist the external force and thereby lifts the supporting board 20 such that the supporting device 1 is balanced. As shown in FIG. 7, when the supporting board 20 is lifted to the outside, the supporting board 20 and the housing 10 generate an angle Θ between them.

When the supporting board 20 opens outward, the sliding lump 321 moves up and squeezes the two V-shaped leaf springs 41 to generate a greater elastic force. Therefore, when the supporting board 20 is further extended outward, the external force exerted on the supporting board 20 is greater. When the external force exerted on the supporting board 20 is removed, the force exerted on the sliding lump 321 by the V-shaped leaf spring 41 causes the sliding lump 321 to return to the bottom, and the linkage trestle 30 and the supporting board 20 return to the position near the bottom wall 112 of the capacity groove 11.

Figure 8:
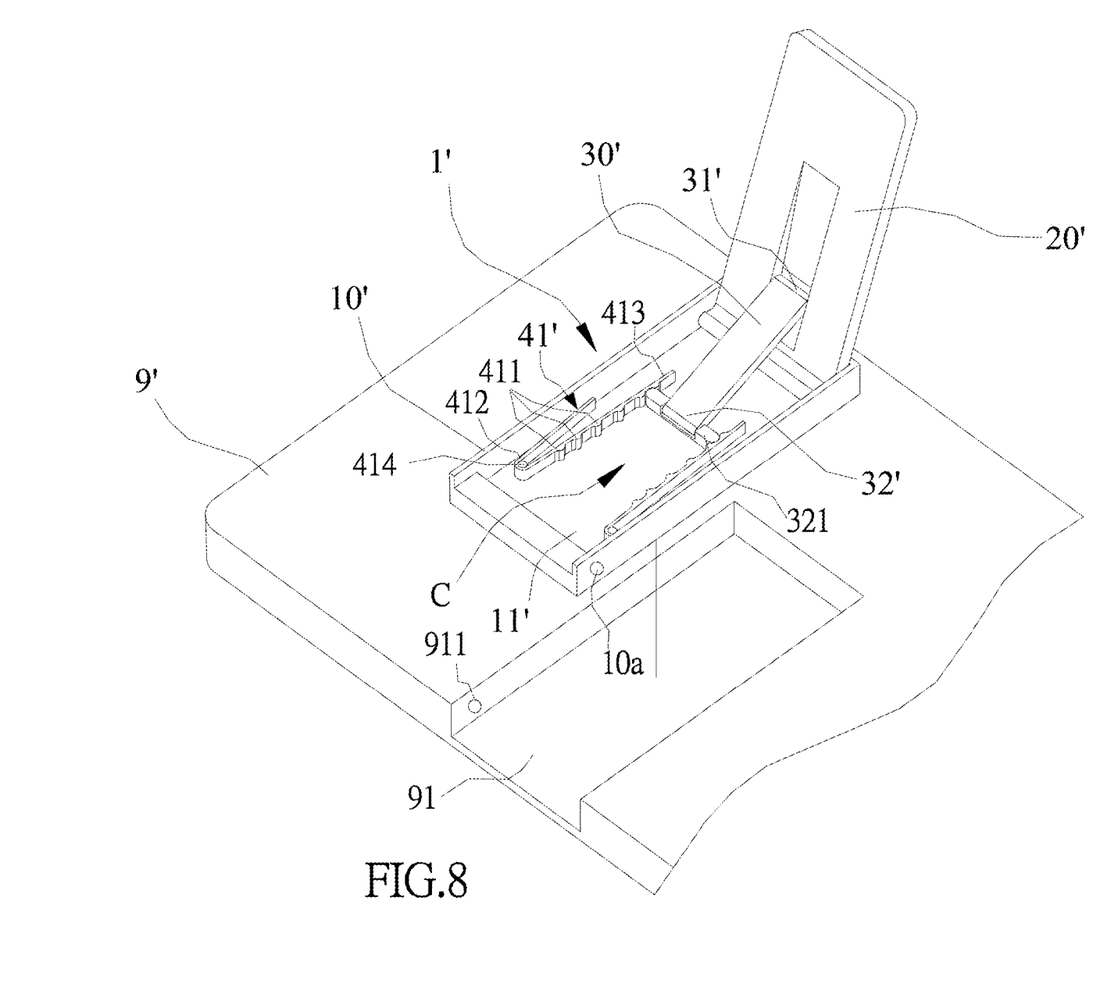
FIG. 8 is a schematic diagram of a second embodiment of the supporting device of the present disclosure.

As shown in FIG. 1 and FIG. 8, the V-shaped leaf spring 41' has a plurality of protrusions 411, and the protrusions 411 are arranged at intervals. The lengths of the intervals between the protrusions 411 are not equal; these intervals of the protrusions 411 regulate the moving distances of the sliding lump 321. The moving distances of the sliding lump 321 correspond to the angle θ between the supporting board 20' and the housing 10'. For clarifying the exact corresponding relationship, the following description is provided.

The length of the supporting board 20' is 210 mm. The length between the pivot end 31' to the sliding end 32' of the linkage trestle 30' is 110 mm. The distance from the supporting board 20' and the pivot place where the housing 10' and the linkage trestle 30' are linked is 50 mm. Given an original angle θ between the supporting board 20' and the housing 10' of 10 degrees, the sliding lump 321 is in the original position. The relationship is presented in the chart below.

| angle θ | distance to the sliding lump 321 | Difference between front and rear |
|---|---|---|
| 10 degrees | 0 mm | — |
| 30 degrees | 12 mm | 12 mm |
| 50 degrees | 31 mm | 17 mm |
| 70 degrees | 49 mm | 18 mm |
| 90 degrees | 66 mm | 17 mm |
| 110 degrees | 78 mm | 12 mm |

As shown in the above chart, any change in the angle θ leads to a different moving distance of the sliding lump 321. The movement distance of the sliding lump 321 corresponds to a change in the angle θ substantially with symmetry. When the angle θ is 50 degrees to 70 degrees, the distance to the sliding lump 321 is the greatest. The difference between the front and rear is the interval between the protrusions 411. On the other side, the change in the angle θ between the supporting board 20' and the housing 10' is equal (equal difference). In one embodiment of the present disclosure, the intervals between the protrusions 411 are equal.

As described above, the housing is a component of the rear cover of the electronic device 9'. In a second embodiment, the housing and the electronic device 9' are separate and individual. The electronic device 9' has a concave groove 91. The concave groove corresponds to the housing 10'. On the surface of the concave groove 91 is disposed at least one concave point 911, and on the outer surface of the housing 10' is disposed at least one convex point 10a; the concave point 911 and the convex point 10a correspond to each other such that the housing 10' and the electronic device 9' can be combined. By this design, the housing 10' and the electronic device 9' can be produced separately; the supporting device 1' is thus modular. The supporting device 1' can be installed on the electronic device 9' according to user requirements.

In summary, the supporting device of the present disclosure has at least the advantages below: Due to the elastic body pressing against the sliding end of the linkage, when the linkage trestle slides along the supporting board, the elastic, force of the elastic body is exerted on the linkage trestle to resist the external force exerted on the supporting board.

Although the present disclosure has been explained in relation to its preferred embodiment, it is also of vital importance to acknowledge that many other possible modifications and variations can be made without departing from the spirit and scope of the disclosure as hereinafter claimed.

What is claimed is:
1. An adjustable supporting device, comprising:
a housing comprising a pivot groove and forming a capacity groove, wherein the pivot groove has a pivot hole;
a supporting board pivotally disposed on the pivot groove of the housing, wherein the supporting board has a pivot shaft, and the pivot shaft is rotatably disposed in the pivot hole;
a linkage trestle comprising a pivot end and a sliding end, the pivot end pivotally disposed on the supporting board, the sliding end slideably disposed in the housing;

a plurality of V-shaped leaf springs disposed in the capacity groove, the plurality of V-shaped leaf springs forming a sliding channel on the housing, and each of the plurality of V-shaped leaf springs including:
an intermediate curved portion, and
two strips,
wherein the intermediate curved portion is connected to one end of each of the two strips, and the intermediate curved portion and the two strips form a V-shape; and
a plurality of fixing columns, wherein each of the plurality of fixing columns is connected to the capacity groove, each of the plurality of fixing columns respectively contacts the intermediate curved portion of a corresponding one of the plurality of V-shaped leaf springs, and each of the plurality of fixing columns is located between the two strips of the corresponding one of the plurality of V-shaped leaf springs;
wherein the sliding channel has a first longitudinal end proximate the plurality of fixing columns and a second longitudinal end distal from the plurality of fixing columns, the sliding end is disposed in the sliding channel, the sliding end abuts the plurality of V-shaped leaf springs, and the plurality of V-shaped leaf springs change a width of the second longitudinal end of the sliding channel when the sliding end slides such that the plurality of V-shaped leaf springs push the sliding end.

2. The adjustable supporting device as claimed in claim 1, wherein the capacity groove has two side walls and a bottom wall, and the sliding end slides on the bottom wall.

3. The adjustable supporting device as claimed in claim 2, wherein the plurality of V-shaped leaf springs consist of two V-shaped leaf springs, and the plurality of V-shaped leaf springs are spaced apart to form the sliding channel.

4. The adjustable supporting device as claimed in claim 3, wherein the sliding end of the linkage trestle has a sliding lump, and the sliding lump is rotatable on a connection end of the sliding end.

5. The adjustable supporting device as claimed in claim 4, wherein each of the plurality of V-shaped leaf springs has at least one protrusion.

6. The adjustable supporting device as claimed in claim 4, wherein each of the plurality of V-shaped leaf springs has a plurality of protrusions and the plurality of protrusions of each of the plurality of V-shaped leaf springs are spaced apart by an interval.

7. The adjustable supporting device as claimed in claim 6, wherein one of the plurality of V-shaped leaf springs abuts against one of the two side walls of the capacity groove and the sliding lump, another of the plurality of V-shaped leaf springs abuts against another of the two side walls of the capacity groove and the sliding lump.

* * * * *